United States Patent
Torresi

[11] 3,786,486
[45] Jan. 15, 1974

[54] MULTIPLEX DRIVING CIRCUIT
[75] Inventor: Vincenzo N. Torresi, Tenafly, N.J.
[73] Assignee: Ing. C. Olivetti & C., S.p.A., Ivrea, Italy
[22] Filed: Aug. 11, 1971
[21] Appl. No.: 170,803

[52] U.S. Cl. .......................... 340/336, 350/160 LC
[51] Int. Cl. .............................................. G09f 9/32
[58] Field of Search .......... 340/324 R, 336, 324 M; 350/160 R, 160 LC; 315/169 TV

[56] References Cited
UNITED STATES PATENTS

| | | | |
|---|---|---|---|
| 3,674,341 | 7/1972 | Hedman, Jr. et al. | 350/160 LC |
| 3,522,471 | 8/1970 | Somlyody | 340/324 R |
| 3,575,492 | 4/1971 | Nester et al. | 350/160 |
| 3,280,341 | 10/1966 | Du Vall | 315/169 TV |
| 3,653,745 | 4/1972 | Mao | 350/160 |

Primary Examiner—John W. Caldwell
Assistant Examiner—Marshall M. Curtis
Attorney—Kevin McMahon

[57] ABSTRACT

A multiplex circuit for driving a multicharacter liquid crystal display, each character having a segmented and a common electrode, which selectively applies an actuating voltage to selected segmented electrodes of all the characters in parallel while applying an AC erasing voltage to the common electrodes of all the nonselected characters. The common electrode of the selected character is set to a reference potential.

5 Claims, 3 Drawing Figures

VINCENZO N. TORRESI
*INVENTOR.*

BY

MULTIPLEX DRIVING CIRCUIT

BACKGROUND OF THE INVENTION

This invention relates generally to multiplex driving circuits, and more particularly to multiplex driving circuits for a liquid crystal display.

Liquid crystal materials are normally transparent, but under the influence of an electric field scatter incident light, and so appear almost opaque. Thin layers of liquid crystal material are used as displays by selectively applying an electric field across selected portions of the liquid crystal layer in image configuration. Normally, the liquid crystal material of a display is confined between closely spaced transparent plates, such as glass, which have the electrodes deposited on them. One such display, used for displaying alphanumerical information, has a conventional seven-segment figure 8 electrode deposited on one of the transparent sheets, and a common electrode on the other sheet directly opposite the seven-segment electrode. Electric fields applied between selected ones of the seven-segment electrodes and the common electrode cause the liquid crystal material therebetween to become opaque. Normally, both the seven-segment and the common electrode are transparent. Other electrode configurations are, of course, also possible.

Multidigit liquid crystal displays, until now, have required the use of parallel driving circuitry. Circuitry of this type requires separate decoders for each digit of the display to decode the input information into selective energization signals for the segments of the seven-segment electrode, and seven external connections from the display for each character. Thus, a total of 7 × N plus 1 external connections are necessary (where N is a number of characters).

Multiplex driving circuitry, on the other hand, has many advantages in that only a single decoder is necessary for all the digits of the display and only 7 + N external connections to the display are necessary. Until now, however, the multiplex driving of multidigit liquid crystal displays has been impossible, since the high resistivity of the liquid crystal material and its low excitation threshold potential cause very severe cross-talk problems with conventional multiplex driving circuitry. This has resulted in reduced contrast and the excitation of unwanted segments.

Attempts to solve these problems by use of isolation diodes connected in series with each segment of the multisegment electrode have not been successful since the capacitance of the diodes is on the same order as the capacitance of the liquid crystal cell, and, at high strobing rates, serious cross-talk problems still exist. Also, the leakage current of the diode is normally enough to operate the cell because the resistance of the liquid crystal cell is on the order of hundreds of megohms.

Furthermore, even if the use of isolating diodes were effective, it would still negate the most important advantages of multiplex driving: namely the reduction of external connections between the display and the driving circuitry and the reduction in the number of components necessary in the driving circuitry.

OBJECTS AND SUMMARY OF THE INVENTION

It is therefore an object of the invention to provide a multiplex driving circuit for a liquid crystal display.

It is a further object of the invention to provide an improved multiplex driving circuit for a liquid crystal display which eliminates cross-talk between electrode segments of the display while minimizing the number of external connections.

In accordance with these and other objects of the invention, there is provided a multiplex driving circuit for a multicharacter liquid crystal display which includes means for sequentially applying a reference potential to the common electrode of successive ones of the characters, and for applying an AC erasing voltage to the common electrode of the other characters, and means synchronized with the means for sequentially applying a reference potential for selectively energizing corresponding ones of said individually energizable electrodes of the characters.

DESCRIPTION OF THE PREFERRED EMBODIMENT

Figure 1:
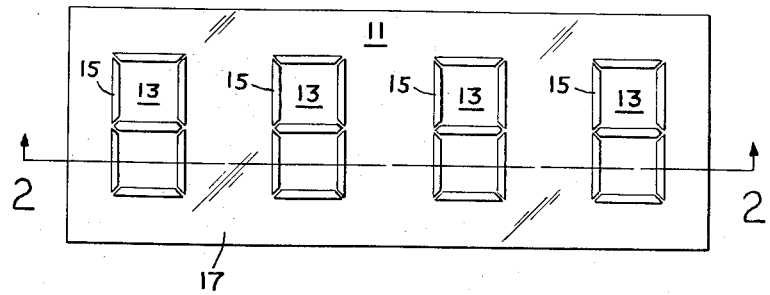
FIG. 1 is a simplified front face view of a four digit liquid crystal display panel.
Figure 2:
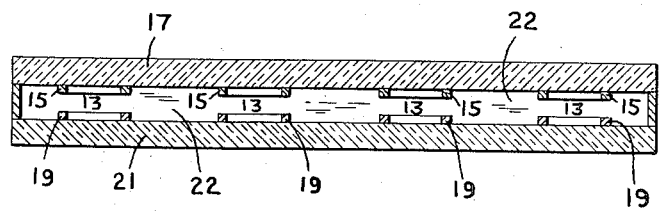
FIG. 2 is an edge view of the display panel of FIG. 1.

Referring now to FIGS. 1 and 2 of the drawings, there is shown a four-character liquid crystal panel 11 in which each of the characters cells 13 is made up of a transparent seven-segment electrode 15 deposited on the surface of a transparent substrate 17 (which may be glass). A common electrode 19 is deposited on a substrate 21 which is parallel and closely spaced from the substrate 19. The common electrode 19 is disposed directly opposite the seven-segment electrode 15. Electrode 21 may be made of a transparent material such as glass, or may be reflective or opaque, depending on the mode in which the liquid crystal is to be used. The electrodes and substrates may conveniently be made out of NESA glass (trademark). The space between the substrates is filled with a liquid crystal material.

In order for the display to be driven on the multiplex mode, the corresponding segments of the seven-segment electrodes 15 for each of the characters 13 must be connected together in parallel. This may be done either by external connections or more conveniently by conductive paths (not shown) deposited on the substrate 17. The second alternative minimizes a number of external connections and is therefore preferred. The conductive paths may be isolated from one another at points where they cross by depositing a layer of dielectric material between the conductive paths at the crossover points. Individual connections are also made with each of the common electrodes 19.

Figure 3:
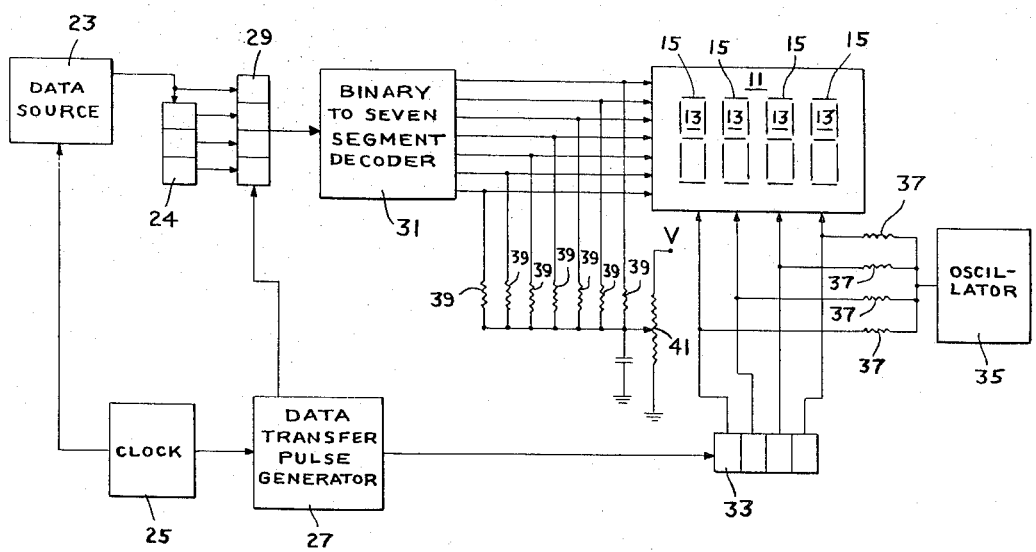
FIG. 3 is a schematic diagram of a preferred embodiment of a multiplex driving circuit according to the invention.

Turning now to FIG. 3 of the drawings, there is illustrated a schematic diagram of a preferred embodiment of the driving circuit according to the invention. In this embodiment, the information to be displayed is generated in serial binary coded decimal form by the data source 23 which may be, for instance, a calculator, a clock, or some other numerical data generating apparatus. Each decimal digit is made up of 4 binary bits.

The binary coded decimal data bits are transmitted from the data source 23 to the three bit series-to-parallel converter circuit 24 in response to clock pulses from clock 25. The clock pulses are also transmitted to the data transfer pulse generator 27, which divides the clock frequency by four, and every fourth clock pulse transmits an enable pulse to the single digit buffer 29. The receipt of the enable pulse by the buffer 29 causes it to read and store first the three bits of the digit which are stored in the series-to-parallel converter 23 and the fourth bit then being generated by the data source 21. Buffer 29 stores this four-bit character code for four clock periods until the next data transfer pulse is generated.

The binary to seven-segment decoder 31 receives and decodes the binary coded decimal digit stored in the four-bit buffer 29, and transmits a DC energization level to the display panel 11 on the proper ones of its seven output lines. Each of the seven output lines from the binary to seven-segment decoder 31 is connected to a corresponding one of the segments of the seven-segment electrodes 15 of each of the character cells 13. Thus, the segments of the seven-segment electrode 15 of all the cells 13 corresponding to the digit stored in the buffer 31 are energized for four clock periods. The transfer of the next digit from the series-to-parallel converter 24 to the buffer 29 causes the decoder 31 to decode this next digit and to energize the output lines corresponding thereto.

The output signal from the data transfer pulse generator 27 is also transmitted as a stepping pulse to the four-bit shift register 33. One of the outputs of the shift register 33 is at a reference potential, such as ground, while the others are essentially open-circuited. The pulses from the data transfer pulse generator 27 to the shift register 33 cause each of the successive outputs of the shift register 33 to be grounded in turn, while the others remain open-circuited.

The four outputs from the four-bit shift register 33 are connected to the common electrode 19 of each of the liquid crystal cells 13. Thus, the shift register 33 operates to ground the common electrode 19 of successive ones of the liquid crystal cells 13, each common electrode 19 being grounded for four clock periods.

The operation of the multiplex driving circuit, according to the invention, is based on the fact that the liquid crystal display can be erased rapidly by the application of an alternating voltage of a frequency on the order of 500 to 5,000 hertz. Thus, in accordance with the invention, an oscillator 35 is connected to each of the output lines of the shift register 33 through resistors 37. Oscillator 35 transmits an AC erasing voltage to the common electrode 19 of each of the liquid crystal cells 13, except the common electrode 19 which is connected to the grounded output of the shift register 33. Thus, each of the ungrounded cells 13 receive an AC erasing voltage at all times, and cannot be actuated by the energization voltage levels received from the binary to seven-segment decoder 31.

In this manner, the circuit, according to the invention, applies a DC actuating voltage only to the selected segments of the selected cell 13. All other segments of the four cells 13 receive either a pulsed erasing voltage, if the cell 13 is not selected, or a DC voltage level below the actuation threshold of the cell 13, if the cell 13 is selected but the segment is not actuated by the binary to seven-segment decoder 31. This system eliminates all cross-talk. Also, the response time of the display, when the data is changed, is much faster because the turnoff of the display is due to the erasing voltage rather than the intrinsically slow relaxation time of the liquid crystal material.

Furthermore, the application of the AC erasing voltage always precedes and follows each actuation of a segment of a seven segment electrode 15. This further insures the elimination of cross-talk.

The DC actuation voltage level on the output lines of the decoder 31 must be enough to apply a full "ON" voltage to the selected segments of the selected cell 13. In the illustrated embodiment, since the common electrode 19 of the selected cell 13 is grounded by the shift register 33, the output of the decoder must be at least equal to the turn-on voltage of the liquid crystal material 22, normally on the order of 30 volts.

The output voltage of the decoder 31 on the unactuated output lines must be below the voltage threshold of the liquid crystal material, normally on the order of seven volts.

In the illustrated embodiment a bias voltage is connected to each of the output lines of the binary to seven-segment decoder 31 through resistors 39, which may be on the order of 100K ohms and which are connected to the wiper of potentiometer 41. Potentiometer 41 is connected between a voltage source V and ground and, in the illustrated embodiment, may be on the order of 10K ohms. This bias voltage should be adjusted to something less than the threshold voltage of the liquid crystal cell, normally about 7 volts. The bias voltage operates both to hold the seven output lines from the binary to seven-segment decoder 31 to a well-defined level when the line is not energized, rather than letting them float, and also helps to compensate for any non-zero average value of the output of the oscillator 35. An uncompensated non-zero average value of the output of the oscillator 35 to the ungrounded common electrodes 19 may tend to cause spurious actuation of some of the segments 15. This average value may be non-zero if the shift register 33 operates to partially clip or rectify the AC voltage applied to the output line when the line is not grounded.

The number of liquid crystal cells 13 which may be driven by a single multiplex driving circuit without apparent flicker of the cells 13 is limited by the intrinsic turn-on time of the presently available liquid crystal materials 22. In order for the display to be free of apparent flicker, each cell must be turned on at least 30 times per second, and to reach maximum contrast the DC actuation voltage must last at least 8 milliseconds. These criteria limit the number of cells which may be driven by a single multiplex circuit. Of course, as liquid crystal materials having faster response times become available, a multiplex circuit according to the invention will be able to drive more cells 13. To drive a different number of cells 13, it is necessary only to change the number of stages in the shift register 33 accordingly.

The multiplex driving circuit, according to the invention, has been described with relation to the driving of seven segment electrode cells. It is, of course, apparent that the driving circuit, according to the invention, may also be used to drive liquid crystal displays having other configurations.

What I claim is:

1. A multiplex driving circuit for a multicharacter liquid crystal display, each of said characters including a plurality of individually actuable electrodes and a common electrode comprising:

sequential means for sequentially connecting a reference potential to the common electrode of successive ones of said characters and means blockable by said connecting means for applying an AC erasing signal to the common electrodes of said characters, and means synchronized with said sequential means for selectively applying an actuating potential to corresponding ones of said individually energizable electrodes of said characters in parallel.

2. The multiplex circuit of claim 1 wherein said means synchronized with said sequential means further includes means for biasing said individually actuable electrodes of said characters to a potential below the threshold actuation potential of the liquid crystal material.

3. The multiplex circuit of claim 1 wherein said means for selectively applying an actuation potential includes means for storing an encoded indication of a character to be displayed and means for decoding said indication for applying an actuation potential to selected ones of said individually actuable electrodes for displaying the character corresponding to said encoded indication.

4. The multiplex circuit of claim 3 further including means for synchronizing the reading by said storage means of the next character to be displayed and the connection by said sequential means of said reference potential to the common electrode of the next character to be actuated.

5. A multiplex driving circuit for a multicharacter liquid crystal display, each of said characters including a plurality of individually energizable electrodes and a common electrode, comprising:

sequential means connected to the common electrodes of all of said characters including means for connecting a reference potential to the common electrode of successive ones of said characters and means blockable by said connecting means for continuously applying an AC erasing signal to the common electrodes of said characters, and means connected in parallel to the corresponding ones of said plurality of individually energizable electrodes and synchronized with said sequential means for selectively applying an actuating potential to said corresponding ones of said individually energizable electrodes of said characters in parallel for impressing an actuating potential difference between the selected individually energizable electrodes of the character whose common electrode is held at said reference potential by said sequential means and the common electrode thereof.

* * * * *